US012466052B2

(12) United States Patent
Lownik

(10) Patent No.: US 12,466,052 B2
(45) Date of Patent: *Nov. 11, 2025

(54) EXTENDABLE WRENCH

(71) Applicant: Milwaukee Electric Tool Corporation, Brookfield, WI (US)

(72) Inventor: Matthew A. Lownik, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 27 days.

This patent is subject to a terminal disclaimer.

(21) Appl. No.: 18/396,943

(22) Filed: Dec. 27, 2023

(65) Prior Publication Data

US 2024/0123599 A1 Apr. 18, 2024

Related U.S. Application Data

(63) Continuation of application No. 17/395,068, filed on Aug. 5, 2021, now Pat. No. 11,890,742, which is a (Continued)

(51) Int. Cl.
*B25G 1/04* (2006.01)
*B25B 13/50* (2006.01)
*B25B 13/48* (2006.01)

(52) U.S. Cl.
CPC .......... *B25G 1/043* (2013.01); *B25B 13/5058* (2013.01); *B25B 13/481* (2013.01)

(58) Field of Classification Search
CPC ... B25G 1/00; B25G 1/01; B25G 1/04; B25G 1/043; B25G 1/066; B25G 3/00;
(Continued)

(56) References Cited

U.S. PATENT DOCUMENTS 59,852 A 11/1866 McLaren
179,276 A 6/1876 Crosby
(Continued)

FOREIGN PATENT DOCUMENTS

AU 2015306723 B2 3/2016
AU 2015306723 A1 3/2017
(Continued)

OTHER PUBLICATIONS

International Search Report and Written Opinion for Application No. PCT/US2019/024955 dated Jul. 17, 2019, 14 pages.
(Continued)

*Primary Examiner* — Robert J Scruggs
(74) *Attorney, Agent, or Firm* — Reinhart Boerner Van Deuren s.c.

(57) ABSTRACT

A pipe wrench is provided with an extendable handle that fits within a cavity of the head. A lever locks the extended length of the extendable handle along a continuous spectrum between a maximum and a minimum extension of the handle. The lever includes cam surfaces. In an unlocked position, the thickness of the lever between the pivot and a friction plate is less than the thickness between the pivot and the friction plate in the locked position. The friction plate is a composite comprising a top lever plate, a midsection, and a concave surface. The lever plate and concave surface include hard, durable materials, and the midsection is a soft elastic material that redistributes frictional forces across the frictional block. The channel-lock prevents inadvertent overextension and/or accidental removal of the extendable handle.

19 Claims, 8 Drawing Sheets

Related U.S. Application Data continuation of application No. PCT/US2021/044280, filed on Aug. 3, 2021.

(60) Provisional application No. 63/060,930, filed on Aug. 4, 2020.

(58) Field of Classification Search
CPC ... B25G 3/12; B25G 3/20; B25G 3/24; B25G 3/28; B25B 1/08; B25B 5/08; B25B 7/14; B25B 13/18; B25B 13/48; B25B 13/481; B25B 13/50; B25B 13/5058; B25B 13/12
See application file for complete search history.

(56) References Cited

U.S. PATENT DOCUMENTS 461,769 A 10/1891 Patton
467,151 A 1/1892 Carpenter
483,785 A 10/1892 Hilts
578,249 A 3/1897 Letteer
592,031 A 10/1897 Waitt
954,335 A 4/1910 Page
966,300 A 8/1910 Bennett
992,127 A 5/1911 Hachmann
998,271 A 7/1911 Barabe
1,000,724 A 8/1911 Duffey
1,032,035 A 7/1912 Beck
1,074,936 A 10/1913 Evans
1,129,771 A 2/1915 Wolfe
1,163,233 A 12/1915 Haban
1,204,999 A 11/1916 McCord
1,209,002 A 12/1916 Martin
1,288,248 A 12/1918 Snowdon
1,334,392 A 3/1920 Lumpkin
1,345,983 A 7/1920 Bell
1,353,246 A 9/1920 Kiefer
1,356,577 A 10/1920 Wiertz
1,362,845 A 12/1920 Carr
1,380,052 A 5/1921 Fowble
1,395,952 A 11/1921 Fraro
1,449,386 A 3/1923 Evans et al.
1,492,478 A 4/1924 Markovich
1,504,870 A 8/1924 Coughlin
1,542,123 A 6/1925 Eifel
1,563,242 A 11/1925 Tweit
1,565,338 A 12/1925 Thewes
1,589,736 A 6/1926 Bell
1,589,763 A 6/1926 Ratcliff
1,599,399 A 9/1926 Bjornson et al.
1,652,355 A 12/1927 Hammer
1,662,002 A 3/1928 Dowd
1,697,764 A 1/1929 Heinz
1,727,623 A 9/1929 Thewes
1,862,002 A 6/1932 Brungardt
2,063,318 A 12/1936 Larson
2,076,830 A 4/1937 Thewes
2,116,743 A 5/1938 Henderson
2,192,702 A 3/1940 Wright
2,282,148 A 5/1942 Mandi
2,483,713 A 10/1949 Seaver
2,502,407 A 3/1950 Gordon
2,517,729 A 8/1950 Smith
2,528,814 A 11/1950 Boyer
2,650,512 A 9/1953 Johnson et al.
2,691,317 A 10/1954 Olson
2,696,133 A 12/1954 Burgess
2,700,911 A 2/1955 Dyczynski
2,813,443 A 11/1957 St. Pierre
3,188,894 A 6/1965 Matsouka
3,657,949 A 4/1972 Myers
3,802,466 A 4/1974 Panella
3,956,949 A 5/1976 Romano
3,996,820 A 12/1976 Tuell
4,541,313 A 9/1985 Wise
4,572,037 A 2/1986 Jeng-Shyong
4,580,468 A 4/1986 Cox
4,596,484 A * 6/1986 Nakatani ................ F16M 11/28
403/109.5
4,597,315 A 7/1986 Chen
4,825,254 A 4/1989 Moritake
4,831,903 A 5/1989 Dausey et al.
4,903,555 A 2/1990 Howard
5,062,328 A 11/1991 Demurger
5,152,198 A 10/1992 Schmitz, Jr.
5,193,419 A 3/1993 Lee
5,251,518 A 10/1993 Woo
5,331,868 A 7/1994 Elmore
5,392,673 A 2/1995 Scott
5,396,820 A 3/1995 Baker
5,517,884 A 5/1996 Sanders
5,542,319 A 8/1996 Wei
5,823,076 A 10/1998 Binkowski
5,832,793 A 11/1998 Collins
5,862,722 A 1/1999 Cislo
5,911,798 A 6/1999 Arnold
5,927,159 A 7/1999 Yokoyama et al.
5,957,008 A 9/1999 Long
5,960,683 A 10/1999 Malkin et al.
6,026,714 A 2/2000 Chang
6,058,814 A 5/2000 Johnson
6,089,129 A 7/2000 Huang
6,098,505 A 8/2000 Chang
6,131,491 A 10/2000 Hirse
D435,410 S 12/2000 Lin
6,167,784 B1 1/2001 Lin
6,223,632 B1 5/2001 Johnson
6,257,102 B1 7/2001 Perry
6,286,396 B1 9/2001 Johnson
6,298,754 B1 10/2001 Brown
6,305,251 B1 10/2001 Pasbrig
6,311,586 B1 11/2001 Hirse
6,334,377 B1 1/2002 Wu
6,336,381 B2 1/2002 McDonnell
6,349,621 B1 2/2002 Khachatoorain
6,393,951 B1 5/2002 Jansson et al.
6,431,033 B1 8/2002 Cheng
6,477,921 B1 11/2002 Picone
D474,380 S 5/2003 Chartier et al.
6,568,283 B2 5/2003 Fanguy
D483,238 S 12/2003 Hsieh
D483,785 S 12/2003 Laituri
6,742,419 B2 6/2004 Chartier et al.
D494,030 S 8/2004 Burry
6,810,775 B2 11/2004 Yang
6,931,969 B2 8/2005 Hsien
6,938,525 B2 9/2005 Poole et al.
6,961,973 B1 11/2005 Smith
6,966,242 B2 11/2005 Picone
6,971,288 B2 12/2005 Wei
7,040,199 B2 5/2006 Gregory
7,044,030 B2 5/2006 Chartier et al.
7,059,221 B2 6/2006 Simon
7,096,764 B2 8/2006 Dong
7,114,824 B2 10/2006 Picone
7,131,355 B2 11/2006 Williams
D546,148 S 7/2007 Becker
D564,848 S 3/2008 Salazar et al.
D571,172 S 6/2008 Yu
7,472,630 B1 1/2009 Velluzzi
7,546,784 B1 6/2009 Yu
7,574,806 B2 8/2009 Wang
7,578,219 B2 8/2009 Wu
7,882,768 B2 2/2011 Urquizu Osa
D657,213 S 4/2012 Pond et al.
8,176,816 B2 5/2012 Simon
D676,727 S 2/2013 Martin et al.
8,549,961 B2 10/2013 Huang
D869,097 S 12/2019 Brown
11,890,742 B2 * 2/2024 Lownik ................. B25G 1/046
2001/0035076 A1 11/2001 Gilbert
2003/0015068 A1 1/2003 Pool et al.
2003/0110905 A1 6/2003 Lacey
2003/0183048 A1 10/2003 Olsen
2004/0237731 A1 12/2004 Ha

(56) References Cited

U.S. PATENT DOCUMENTS

| | | | |
|---|---|---|---|
| 2005/0115367 | A1 | 6/2005 | Williams |
| 2005/0204873 | A1 | 9/2005 | Ana |
| 2005/0243553 | A1 | 11/2005 | Picone |
| 2006/0053982 | A1 | 3/2006 | Mo |
| 2006/0196319 | A1 | 9/2006 | Hung et al. |
| 2007/0074608 | A1 | 4/2007 | Mo |
| 2007/0125205 | A1 | 6/2007 | Beckwith et al. |
| 2007/0245861 | A1 | 10/2007 | Shields |
| 2009/0193940 | A1 | 8/2009 | Kuo |
| 2009/0217790 | A1 | 9/2009 | Harter |
| 2010/0050825 | A1 | 3/2010 | May |
| 2010/0083798 | A1 | 4/2010 | Tai |
| 2010/0122612 | A1 | 5/2010 | Kovach et al. |
| 2010/0242686 | A1 | 9/2010 | Gower |
| 2011/0232427 | A1 | 9/2011 | Streater et al. |
| 2012/0324682 | A1* | 12/2012 | Ballentine ............. F16B 7/1454 24/535 |
| 2014/0007744 | A1 | 1/2014 | Watson et al. |
| 2014/0069238 | A1 | 3/2014 | Chang |
| 2014/0083260 | A1 | 3/2014 | Kundracik et al. |
| 2014/0116206 | A1 | 5/2014 | Chartier et al. |
| 2015/0000476 | A1 | 1/2015 | Li |
| 2015/0360351 | A1* | 12/2015 | Harvey ............... B25B 13/5058 81/167 |
| 2019/0299372 | A1 | 10/2019 | Corporation |

FOREIGN PATENT DOCUMENTS

| | | |
|---|---|---|
| CN | 2726826 | 9/2005 |
| CN | 201102213 | 8/2008 |
| CN | 201511326 | 6/2010 |
| CN | 203210256 | 9/2013 |
| CN | 204431137 | 7/2015 |
| CN | 105919524 | 9/2016 |
| CN | 208342673 U | 1/2019 |
| DE | 202006018047 | 3/2007 |
| GB | 711231 | 6/1954 |
| GB | 753198 | 7/1956 |
| JP | 06021856 | 3/1994 |
| JP | 09-296813 A | 11/1997 |
| KR | 200219607 | 4/2001 |
| KR | 20-0227021 | 6/2001 |
| TW | 234970 | 11/1994 |
| TW | 309827 | 7/1997 |
| TW | 451783 | 8/2001 |
| TW | 493505 | 7/2002 |
| TW | 501520 | 9/2002 |
| TW | M311538 | 5/2007 |
| TW | M344224 | 11/2008 |
| TW | M440851 | 11/2012 |
| TW | M465252 | 11/2013 |
| TW | M471338 | 2/2014 |
| WO | WO9740964 | 11/1997 |

OTHER PUBLICATIONS

International Search Report and Written Opinion for Application No. PCT/US2021/044280 dated Nov. 17, 2021, 11 pages.

International Search Report and Written Opinion for Application No. PCT/US2014/031880 dated Aug. 29, 2014, 14 pages.

International Search Report and Written Opinion for Application No. PCT/US2015/046847 dated Dec. 4, 2015, 12 pages.

Machine Translation of CN203210256U generated by Patent Translate at http://translationportal.epo.org/emtp/translate/?ACTION=description-retrieval& COUNTRY=CN&ENGINE=google&FORMAT=docdb&KIND=U&LOCALE=en_EP&NUMBER=203210256&OPS=ops.epo.org/3.2&SRCLANG=zh&TRGLANG=en, 12 pages.

* cited by examiner

EXTENDABLE WRENCH

CROSS-REFERENCE TO RELATED PATENT APPLICATIONS

The present application is a continuation of U.S. application Ser. No. 17/395,068, filed Aug. 5, 2021, which is a continuation of International Application No. PCT/2021/044280, filed Aug. 3, 2021, which claims the benefit of and priority to U.S. Provisional Application No. 63/060,930, filed on Aug. 4, 2020, which are incorporated herein by reference in their entireties.

BACKGROUND OF THE INVENTION

The present invention relates generally to the field of wrenches. The present invention relates specifically to an extendable wrench. Wrenches, such as pipe wrenches, are often used to rotate, tighten, and manipulate pipes, valves, fittings, and other plumbing elements. Pipe wrenches often include a jaw and a handle used to rotate the jaw.

SUMMARY OF THE INVENTION

One embodiment relates to a wrench including an upper jaw with teeth and a threaded section, a head, an extendable handle, a lever, and a friction block. The head includes an aperture. The wrench includes a bore at a first end of the head, the bore extending along a longitudinal axis of the pipe wrench. The wrench further includes a lower jaw coupled to a second end of the head. The lower jaw includes a plurality of teeth that define a lower contact region. The wrench includes an upper jaw at least partially extending through the aperture of the head. The upper jaw includes a threaded section and a plurality of teeth that define an upper contact region. The wrench further includes an actuator with threads engaged with the threaded section of the upper jaw such that rotation of the actuator moves the upper jaw relative to the lower jaw. An extendable handle is received within the bore of the head. The wrench further includes a lever and a friction block. The lever is rotatable about a pivot between a locked position in which the extendable handle is fixed with respect to the head and an unlocked position in which the extendable handle is adjustable with respect to the head. The head further includes a rear surface. The rear surface includes a recess shaped to receive the lever when the lever is in the locked position. The friction block is positioned between the lever and the extendable handle.

Another embodiment relates to a pipe wrench including a head with an aperture. The wrench further includes a bore at a first end of the head extending along a longitudinal axis of the pipe wrench. The pipe wrench including a lower jaw coupled to a second end of the head. The lower jaw including a plurality of teeth that define a lower contact region. The pipe wrench further including an upper jaw partially extending through the aperture of the head. The upper jaw including a plurality of teeth that define an upper contact region. The pipe wrench includes an actuator with threads engaged with the threaded section of the upper jaw such that rotation of the actuator moves the upper jaw relative to the lower jaw. An extendable handle is received within the bore of the head. The pipe wrench further includes a channel lock mechanism configured to retain the extendable handle within the bore and a handle length locking mechanism. The handle length locking mechanism includes a lever pivotally coupled to the head and a friction element contacting the lever. The lever is rotatable about a pivot between a locked position in which the lever pushes the friction element into engagement with an outer surface of the extendable handle such that the extendable handle is fixed with respect to the head and an unlocked position in which the extendable handle is adjustable with respect to the head. The head further includes a rear surface. The rear surface of the head includes a recess shaped to receive the lever when the lever is in the locked position. The friction block is positioned between the lever and the extendable handle.

Another embodiment relates to a pipe wrench including a head with an aperture. The wrench further includes a bore at a first end of the head extending along a longitudinal axis of the pipe wrench. The pipe wrench including a lower jaw coupled to a second end of the head. The lower jaw including a plurality of teeth that define a lower contact region. The pipe wrench further including an upper jaw partially extending through the aperture of the head. The upper jaw including a plurality of teeth that define an upper contact region. The pipe wrench includes an actuator with threads engaged with the threaded section of the upper jaw such that rotation of the actuator moves the upper jaw relative to the lower jaw. An extendable handle is received within the bore of the head. The pipe wrench further includes a lever and a friction block. The lever is rotatable about a pivot between a locked position in which the extendable handle is fixed with respect to the head and an unlocked position in which the extendable handle is adjustable with respect to the head. The head further includes a rear surface. The rear surface of the head includes a recess shaped to receive the lever when the lever is in the locked position. The friction block is positioned between the lever and the extendable handle. The lever applies a normal force on the friction block and the friction block distributes the force to the extendable handle sich that the extendable handle is secured at a desired length.

Various embodiments of the invention also relate to arms and gripping portions of the lever, cam surfaces of the lever, a multi-layered friction block, and a locking mechanism that locks a handle at any length, as may be selected by a user, between the maximum and minimum extension lengths. In specific embodiments, the lever is located within a recess to prevent inadvertent rotation and enhance user access to lever.

In specific embodiments, a channel-lock includes a spring-loaded protrusion that follows an overtravel channel. The channel-lock orients the handle relative to the head to prevent overextension or inadvertent removal of handle. In various embodiments, the channel lock includes a pocket and an angled groove such that two coordinated user motions are needed to remove the handle deliberately. In specific embodiments, the friction block includes hard, durable top lever plate and concave surface layers. The midsection layer is made from an elastically compressible material to distribute the friction generating load evenly.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of an extendable pipe wrench are shown. Pipe wrenches include upper and lower jaws that are rotated about a fastener, pipe, valve, fitting, or another joint. Applicant has found that including an extendable handle within the head of the pipe wrench enables the operator to expand or contract the overall length (e.g., size) along a continuous range of the pipe wrench. A channel-lock prevents overextension of the handle from the head of the pipe wrench. A friction plate or block enables the user to secure and lock the desired pipe wrench length at a user-desired location at any point along the handle length between maximum and minimum handle lengths. Specifically, the user determines the desired/needed length (e.g., location) to lock the handle at any point along the handle length between maximum and minimum handle lengths to provide the desired pipe wrench length for the task or application.

Applicant has found that the ability to select a handle length location anywhere within a range between a maximum and minimum value/length) enables the user to select the desired length of the pipe wrench. For example, a longer handle increases the lever arm of the pipe wrench, but the length may be limited within an enclosed area. In this case, the user can extend the handle to the maximum distance available in the tight area and maximize the applied torque within the limits of the space available.

Figure 1:
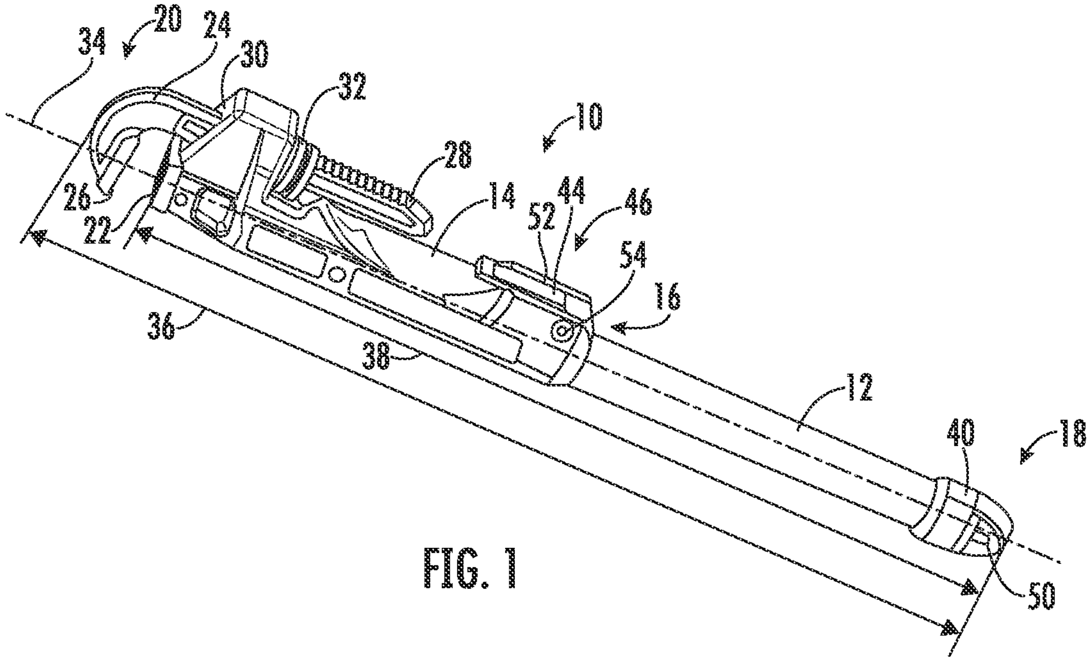
FIG. 1 is a perspective view of a pipe wrench with an extendable handle, according to an exemplary embodiment.
Figure 2:
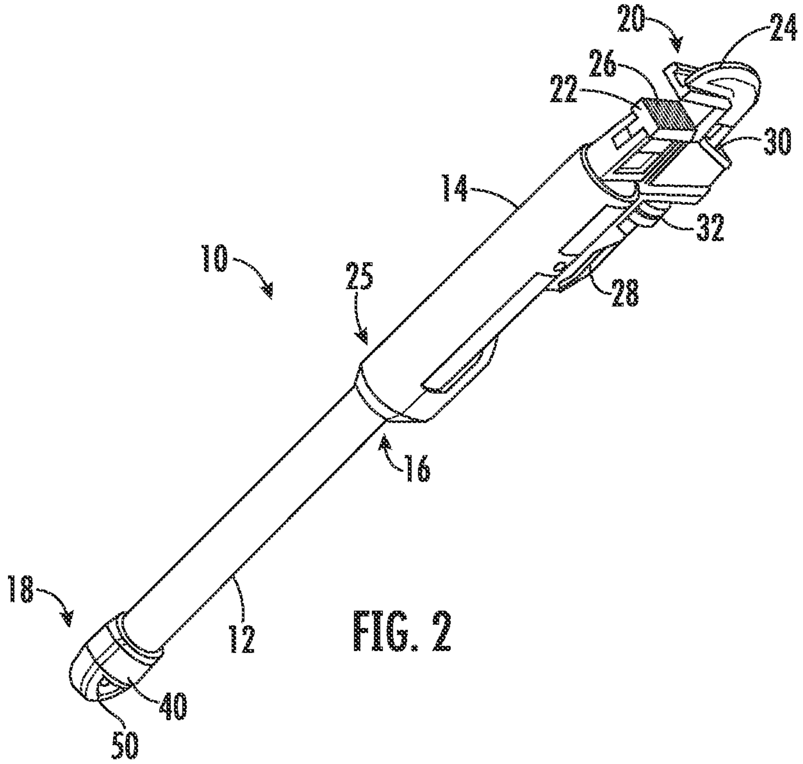
FIG. 2 is another perspective view of a pipe wrench with an extendable handle, according to an exemplary embodiment.
Figure 9:
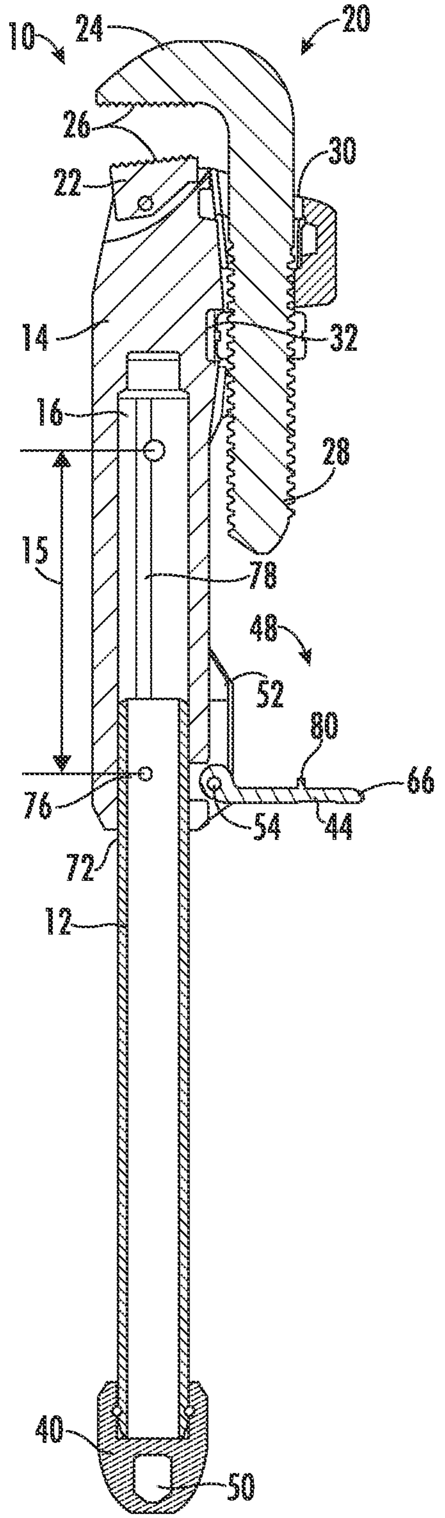
FIG. 9 is a cross-sectional view of the pipe wrench with the lever in an unlocked position, according to an exemplary embodiment.

Referring to FIGS. 1 and 2, different perspective views of a pipe wrench 10 with an extendable handle 12 are shown. Pipe wrench 10 is shown with handle 12 in a maximum extended position. Pipe wrench 10 includes a body or head 14 and an extendable handle 12 that is extendable to any length along a range 15 between the maximum and minimum lengths (FIG. 9). In other words, handle 12 does not have discreet locking locations and, as will be discussed below, pipe wrench 10 includes an innovative locking structure that allows handle 12 to be locked at any location, as selected by the user, between the maximum and minimum lengths to extend the proximal end 18 of pipe wrench 10. In specific embodiments, handle 12 and/or head 14 are formed from metal materials, such as metallic alloys, specifically aluminum alloys.

Head 14 has an aperture or bore 16 at a first end 25 to receive the extendable handle 12. At a second or distal end 20 (e.g., opposite bore 16 on the first end 25), head 14 is coupled to a first or lower jaw 22 and a second hook or upper jaw 24. Lower jaw 22 has a plurality of teeth 26 that form the working/contact area of the lower jaw 22 defining a lower contact region and can be fixed or removably coupled to head 14. For example, a removable lower jaw 22 is replaceable, such that when teeth 26 of lower jaw 22 are worn, a user replaces the entire working area of the lower jaw 22.

An extended upper jaw 24 has a plurality of teeth 26 that form the upper working/contact area of the upper jaw 24 defining an upper contact region and includes a threaded extension 28 that passes through an aperture 30 of head 14. Threaded extension 28 of upper jaw 24 is coupled to head 14 with an actuator, shown in FIGS. 1 and 2 as thumbwheel 32. Together, teeth 26 on the lower and upper jaws 22 and 24 form contact regions that enable the user to grasp and rotate the pipe, fitting, valve, or other structure. In other words, the opposing teeth 26 on lower and upper jaws 22 and 24 cooperate to grasp the fitting and rotate it with pipe wrench 10 when the operator applies a force on handle 12.

Thumbwheel 32 is captured within aperture 30 on head 14 and serves to open and close upper jaw 24 relative to the lower jaw 22. When the operator rotates thumbwheel 32, threads within thumbwheel 32 engage the threaded extension 28 portion of upper jaw 24 and move upper jaw 24 relative to lower jaw 22. In this way, the user can vary the distance or extension between the lower and upper jaws 22 and 24 along a longitudinal axis 34 of pipe wrench 10.

As used herein, total length 36 of pipe wrench 10 refers to the length from the proximal end 18 of handle 12 to a top of upper jaw 24 along longitudinal axis 34. As such, the total length 36 includes the extension of upper jaw 24. As used herein, an extended handle length 38 refers to the length as measured along longitudinal axis 34 from the proximal end 18 of handle 12 to lower jaw 22.

Figure 4:
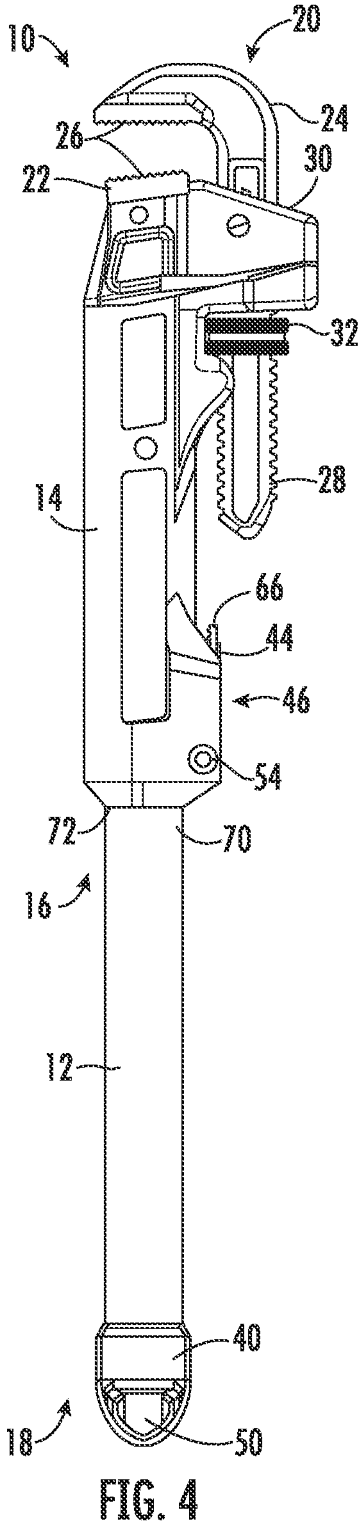
FIG. 4 is a left side view of the pipe wrench with a lever in a locked position, according to an exemplary embodiment.
Figure 5:
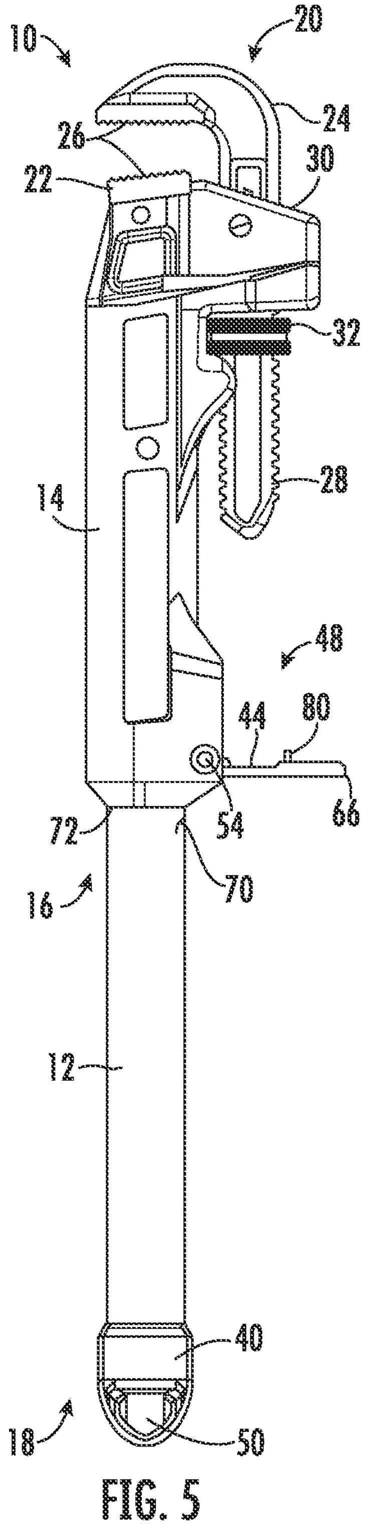
FIG. 5 is a left side view of the pipe wrench of FIG. 4 with the lever in an unlocked position, according to an exemplary embodiment.

A bore 16 is located on first end 25 of head 14 opposite lower jaw 22. A distal end of extendable handle 12 is inserted into bore 16, and handle 12 includes a cap 40 on proximal end 18 of handle 12. Handle 12 slides into and out of head 14 through bore 16. Handle 12 is locked into position at any location along its length between maximum extension and minimum extension locations within bore 16, as selected by the operator. In other words, an operator adjusts the total length 36 of pipe wrench 10 (defined from upper jaw 24 to cap 40), by adjusting both the thumbwheel 32 and the locked position of extendable handle 12 within bore 16. As will be discussed in more detail below, the user slides extendable handle 12 within bore 16 to the desired length and rotates a locking lever 44 into the locked position 46 to fix or lock handle 12 at the selected desired length with respect to the head. For reference, FIG. 4 shows lever 44 in the locked position 46, and FIG. 5 shows lever 44 in an unlocked position 48.

In the embodiment shown, cap or end cap 40 is disposed on proximal end 18 of handle 12 and provides a rotatable attachment location or handle loop 50. For example, loop 50 rotates freely (360 degrees) about longitudinal axis 34, such that loop 50 can be tethered or hooked for storage in any orientation of pipe wrench 10. Cap 40 also prevents debris and other foreign objects from entering a hollowed handle 12, thereby enabling a hollow handle 12 to reduce the weight of pipe wrench 10.

In the locked position 46 (FIGS. 1, 3-4, 6, 8, 10, 16A and 17), lever 44 is housed within a slot or recess 52 on a rear surface 53 of head 14. In other words, recess 52 is shaped to receive and protects lever 44 from inadvertent unlocking. For example, recess 52 protects lever 44 from getting caught on a lanyard and being inadvertently opened during operation. Handle 12 adjustment includes extending (e.g., pulling) or retracting (e.g., pushing) extendable handle 12 out of or into bore 16 in head 14 to increase or decrease the extended handle length 38 and total length 36 of pipe wrench 10.

In use, handle 12 is locked to prevent inadvertent adjustment to the extended handle length 38. An operator adjusts the extended handle length 38 through rotation of a cam lever 44 about a pivot 54. Lever 44 rotates from a locked position 46 (FIG. 4) to an unlocked position 48 (FIG. 5) to release extendable handle 12.

A friction block 56 (FIG. 14) is located in between lever 44 and extension handle 12 to increase the frictional force created when lever 44 is rotated. Lever 44 creates a normal-force that is distributed from friction block 56 on handle 12 to secure or lock the location of extension handle 12 with a friction fit. The user rotates lever 44 to the unlocked position 48 to release friction block 56 from against extendable handle 12. In the locked position 46, friction block 56 distributes the normal-force created by lever 44 to increase the friction and lock/secure the extendable handle 12 at a desired extended handle length 38 along the longitudinal axis 34.

Figure 12:
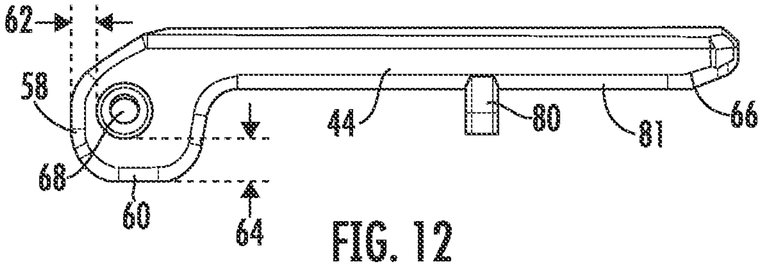
FIG. 12 is a detailed view of the lever with cam surfaces, according to an exemplary embodiment.

As will be described in greater detail below, lever 44 includes different cam surfaces on a wall 58 and a base 60 (e.g., it is a cam lever 44). In the unlocked position 48, a wall thickness 62 that presses against friction block 56 is less than a base thickness 64 of lever 44 pressing against friction block 56 in the locked position 46. (FIG. 12). The cam surface configuration enables the lever to lock the extended handle length 38 at any location a user identifies along the longitudinal axis 34 of extendable handle 12. In other words, the operator can lock the extendable handle 12 at any extended handle length 38 between maximum and minimum handle lengths (e.g., between the maximum and minimum extension lengths).

Figure 3:
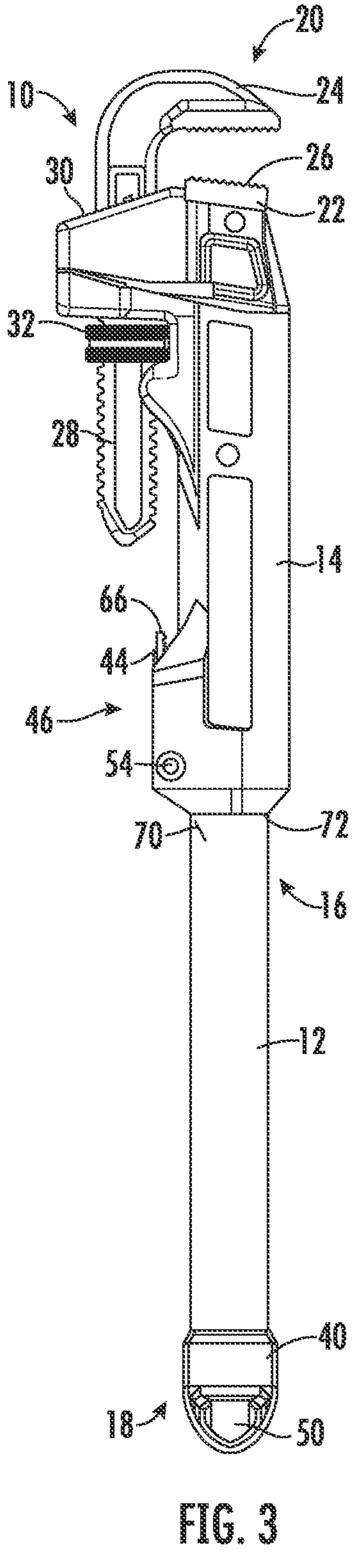
FIG. 3 is a right side view of the pipe wrench, according to an exemplary embodiment.

FIGS. 3 and 4 show opposite right and left sides of pipe wrench 10 in a locked position 46, respectively. In the locked position, a tip or gripping end 66 of lever 44 extends beyond recess 52 to provide access to a portion of lever 44. In this way, recess 52 protects lever 44 from inadvertent rotation. However, gripping end 66 is accessible to an operator to grasp lever 44 in the locked position 46 and rotate lever 44 to the unlocked position 48. In the unlocked position 48, handle 12 slides freely into and/or out of bore 16 in the head 14 to increase or decrease the extended handle length 38.

With reference to FIGS. 4 and 5, lever 44 rotates about a pin, fastener, or pivot 54 that both captures lever 44 within opposite sides of head 14 (e.g., within recess 52) and permits rotation of lever 44. Pivot 54 spans from a right side (FIG. 3) to a left side (FIG. 4) of head 14 and passes through a central hole 68 (see e.g., FIG. 12) of lever 44 that creates at least two cam surfaces and capture lever 44. As lever 44 rotates about pivot 54, a normal-force against friction block 56 changes to lock/unlock extendable handle 12.

Figure 6:
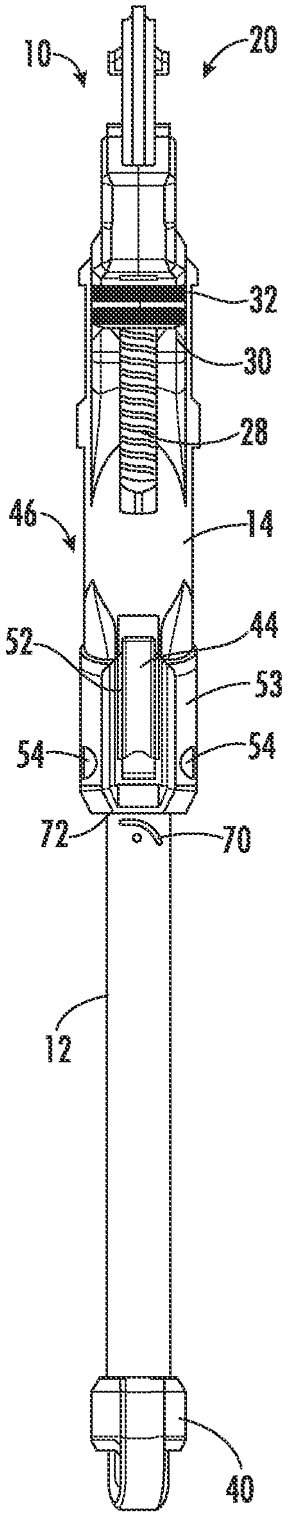
FIG. 6 is a rear side view of the pipe wrench of FIG. 4 with the lever in a locked position, according to an exemplary embodiment.
Figure 7:
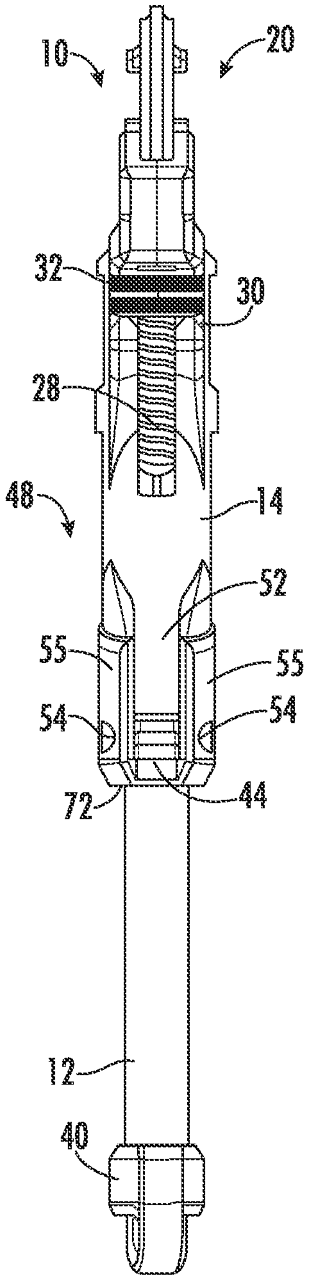
FIG. 7 is a rear side view of the pipe wrench of FIG. 4 with the lever in an unlocked position, according to an exemplary embodiment.

FIGS. 6 and 7 show side views of a locked and unlocked pipe wrench 10, respectively, from the rear to provide a top view of the rotating lever 44. FIGS. 6 and 7 also show maximum and minimum extendable handle lengths 38, respectively. Stated differently, FIGS. 6 and 7 illustrate the range between maximum and minimum extendable handle lengths.

Specifically, FIG. 6 shows pipe wrench 10 in a fully extended position, such that a visual indicator 70, shown as a laser etching, aligns with an edge 72 of bore 16 on head 14. FIG. 6 further shows pipe wrench 10 in the locked position 46 with lever 44 locked within recess 52 on head 14. In contrast, FIG. 7 shows lever 44 rotated into the unlocked position 48 and extendable handle 12 at least partially slid within head 14. From this unlocked position, the user slides at least a portion of the extendable handle 12 out of head 14 to increase the extended handle length 38 of pipe wrench 10.

Figure 8:
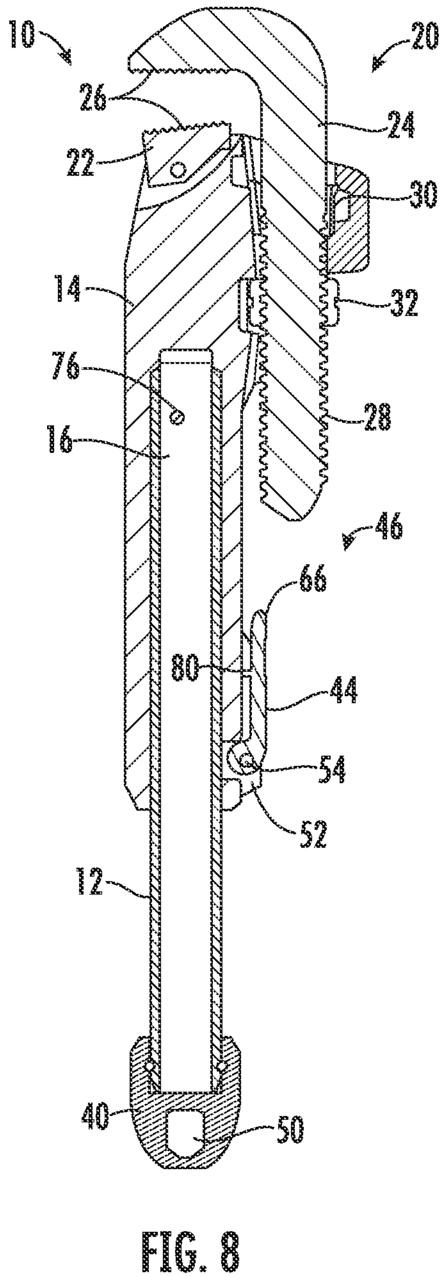
FIG. 8 is a cross-sectional view of the pipe wrench with the lever in a locked position, according to an exemplary embodiment.

FIGS. 8 and 9 also illustrate the range of handle 12 between the maximum and minimum extendable handle lengths 38. An operator can lock handle 12 at any length along the range 15 shown in FIG. 9. FIG. 8 illustrates the full compression of extendable handle 12, showing the minimum extension of handle 12. In contrast, FIG. 9 illustrates a maximum extension of extendable handle 12.

Figure 10:
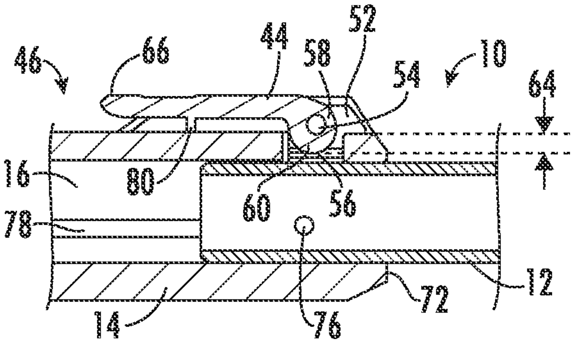
FIG. 10 is a detailed cross-section of the lever in a locked position within a slot on the handle, according to an exemplary embodiment.
Figure 11:
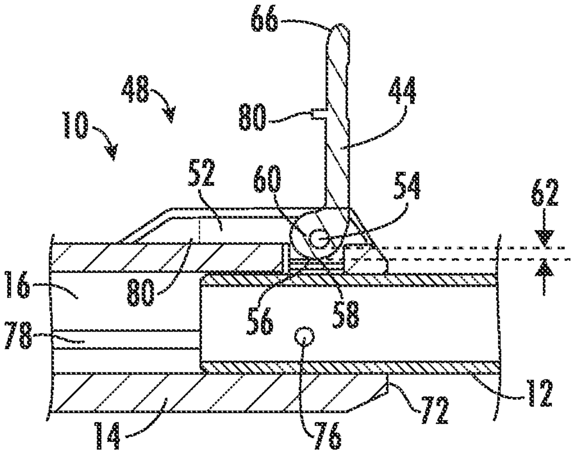
FIG. 11 is a detailed cross-sectional view of the lever extending from within the slot of the handle in an unlocked position, according to an exemplary embodiment.

FIG. 8 is a cross-sectional view of pipe wrench 10 in a compressed or minimum extension position (e.g., minimum extended handle length 38). Lever 44 is rotated in a locked position 46 and presses against friction block 56 to create a frictional lock on handle 12. As shown in FIGS. 10-12, the base thickness 64 of the cam surfaces on lever 44 is greater than the wall thickness 62 on a rotated side surface. With reference to FIGS. 8 and 12, in the locked position 46 the increased base thickness 64 formed along a bottom surface of lever 44, increases the normal-force pressed on friction block 56. The increased normal-force creates a friction force that adequately locks extendable handle 12. In contrast, FIGS. 9 and 11 show lever 44 in an unlocked position 48 and wall thickness 62 of the rotated lever 44 (e.g., cam surface along a side or wall of lever 44) is less than the base thickness 64 of lever 44. When cam lever 44 is rotated into the unlocked position 48, the reduced wall thickness 62 decreases the normal-forces that generate the locking frictional force and unlocks the extendable handle 12.

FIG. 9 is a cross-sectional view of the pipe wrench with the lever in an unlocked position. As shown in FIG. 9, extendable handle 12 is fully extended. Further extension of handle 12 could result in inadequate coupling within bore 16 (e.g., insufficient overlap between handle and bore) to transfer the applied torque to lower and upper jaws 22 and 24. Similarly, an inadvertent further extension could result in the removal and/or loss of handle 12 from within bore 16.

Accordingly, pipe wrench 10 is configured to limit/prevent unintended extension of handle 12 past the position shown in FIG. 9.

Figure 13:
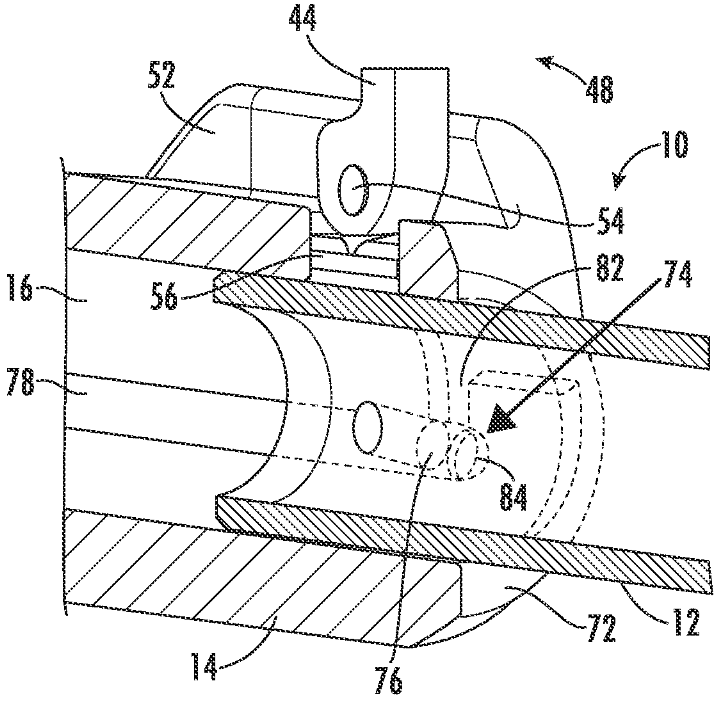
FIG. 13 is a detailed cross-sectional perspective view of a channel-lock to retain the handle and prevent overextension or removal of handle in the unlocked position, according to an exemplary embodiment.

Specifically, referring to FIG. 9 and FIG. 13, channel-lock 74 includes a biased projection 76, shown as spring-loaded projection 76 on extendable handle 12 that fits within an overextension channel 78 extending longitudinally inside bore 16. Projection 76 is configured to slide and/or ride within channel 78 during adjustment of handle 12 to prevent inadvertent overextension and/or removal of extendable handle 12. Spring-loaded projection 76 on handle 12 and channel 78 in bore 16, limits accidental removal of handle 12. Additionally, spring-loaded projection 76 can lock within holes in channel 78 of handle 12 at specific desirable discrete locations (e.g., a minimum, maximum, and/or central extendable handle length). In some embodiments, projection 76 is located within bore 16, and overextension channel 78 extends along handle 12.

FIGS. 10 and 11 are detail views of portions of FIGS. 8 and 9 to show the features of lever 44 in the locked position 46 and unlocked position 48, respectively. As shown in FIG. 10, lever 44 has a base 60 and a wall 58. The base thickness 64 is measured between an edge of pivot 54 and base 60. Similarly, the wall thickness is measured between an edge of pivot 54 and the wall 58.

Because lever 44 includes cam surfaces (e.g., base 60 and wall 58), the orientation of lever 44 changes the force applied to handle 12 (e.g., through friction block 56). Base thickness 64 is greater than wall thickness 62, such that when lever 44 is oriented in the locked position 46, base 60 creates a greater normal-force that presses firmly against friction block 56 to secure (e.g., lock) extendable handle 12 with a friction fit. When lever 44 is released and rotated to the unlocked position 48, wall 58 provides lower wall thickness 62 and reduces the normal-force exerted against friction block 56, thereby releasing handle 12.

Lever 44 also includes an arm 80 coupled to an inner surface 81 of lever 44 that orients lever 44 with an offset relative to head 14. Arm 80 extends across inner surface 81 in a generally perpendicular orientation relative to a longitudinal axis of lever 44 and keeps gripping end 66 of lever 44 off of the surface of head 14 and makes it easier to grasp by a user. Lever 44 and arm 80 securely fit within recess 52 of handle 12 in the locked position 46. Head 14 has shoulders 55 on either side of recess 52 that prevent inadvertent release of the locking mechanism (e.g., rotation of lever 44 about pivot 54). FIG. 11 shows lever 44 rotated into the unlocked position 48 and extending from recess 52 of handle 12. In this unlocked position 48, the user can grasp arm 80 to locate gripping end 66 and close lever 44. Wall 58 decreases the wall thickness 62 of cam lever 44 and releases the normal-force creating friction between friction block 56 and extendable handle 12, enabling a user to freely adjust extendable handle 12 to any desired length or location between maximum and minimum locations.

FIG. 12 is a detailed side view of the cam lever 44 showing the cam surfaces of base 60 and wall 58 that create a thicker base thickness 64 than wall thickness 62. When cam lever 44 rotates in the locked position 46 such that base 60 is in contact with friction block 56, the increased base thickness 64 exerts a greater normal-force on friction block 56. This creates a higher pressure between friction block 56 and handle 12 and increases the total frictional force locking handle 12. Whereas, when cam lever 44 is rotated in the unlocked position 48 such that wall 58 is in contact with friction block 56, the decreased wall thickness 62 reduces the normal-force and reduces the pressure on friction block 56 to release handle 12.

In other words, lever 44 includes a cam, such that the thickness of lever 44 is not uniform. In the locked position 46, the base thickness 64 increases the normal-force and pressure within friction block to create a secure friction fit. In the unlocked position 48, the wall thickness 62 reduces the normal-force and pressure to release the friction force on handle 12.

FIG. 13 is a perspective cross-sectional view of a detailed first end 25 of head 14 having a channel-lock 74 that includes a spring-loaded projection 76, a channel 78, and an angled groove 82. During adjustment of handle 12 (e.g., either extension or retraction), the projection 76 in handle 12 slides through the channel 78 in head 14. At the maximum extension of handle 12, channel 78 includes pocket 84 at the first end 25 of head 14. Pocket 84 captures and retains projection 76 to prevent overextension or release of handle 12. To remove handle 12 from head 14, the user rotates lever 44 into the unlocked position 48 and extends the handle 12 to the maximum extension before rotating the projection 76 through angled groove 82. When angled groove 82 interfaces with the biased projection 76, the biased projection is pushed inward and the handle 12 is released and the entire handle 12 can be removed from bore 16.

As can be seen in FIG. 13, the channel-lock 74 mechanism includes both a pocket 84 and an angled groove 82. Pocket 84 captures projection 76 during inadvertent extension and prevents inadvertent dislocation of extendable handle 12. Angled groove 82 enables the user to release the handle 12 from within head 14 through the combined rotation and continued extension of handle 12. In other words, to release/remove extendable handle 12, the user deliberately rotates projection 76 through angled groove 82 and further extends the handle 12.

Figure 14:
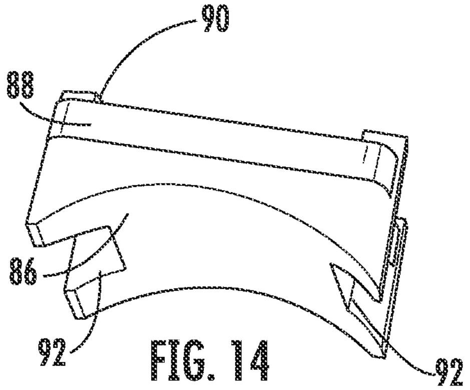
FIG. 14 is a perspective view of a friction block, according to an exemplary embodiment.

FIG. 14 is a perspective view of a composite friction block 56. Friction block 56 includes different material layers that are sandwiched together or stacked to enhance the locking properties on the extendable handle 12. Friction block 56 includes a concave surface 86 along a bottom layer of friction block, a soft compressible elastic midsection 88, and a rigid top layer or lever plate 90. In various embodiments, the lever plate 90 and midsection 88 are relatively flat rectangular shapes, with various inserts 92 that receive tabs 94 to retain friction block 56. Concave surface 86 is curvilinear and/or has a radial contour along a bottom section to distribute the normal-force across the outer circumference of handle 12 and increase the friction force generated by friction block 56. Concave surface 86 and lever plate 90 are also fabricated from a hard and/or rigid material to prevent excessive wear on the components, and midsection 88 includes a compressible elastic material that helps distribute the normal-force exerted on lever plate 90 more evenly across concave surface 86. Applicant has found that midsection 88 also enhances manufacturability by increasing the manufacturing tolerances for the thickness of the friction block 56 and or base thickness 64.

In a specific embodiment, concave surface 86 is formed from a first material having a first hardness, midsection 88 is formed from a second material having a second hardness and lever plate 90 is formed from a third material having a third hardness. In such an embodiment, the second hardness is less than the first hardness and the third hardness. Concave surface 86 is made from a relatively hard material. Concave surface 86 is a hard base layer for increasing friction and toughness. The hard composite material (e.g., ABS, polymer or metal alloy) enhances the area of concave surface 86 that contacts extendable handle 12 to generate friction and provides a hard, durable material that is less susceptible to wear.

Midsection 88 is a compressible layer of rubber, polymer, or elastic dampening material that is compressibly elastic to redistribute loads and forces exerted on concave surface 86. For example, midsection 88 is a lightweight thermoplastic rubber (TPR) or vulcanized rubber material. Applicant has found that using a soft/elastic midsection 88 redistributes any local or generated frictional forces created on concave surface 86 and/or extendable handle 12. For example, the spring and damper provided by midsection 88 evenly distribute local loads between concave surface 86 and lever plate 90. Midsection 88 also enhances manufacturability by providing a more extensive acceptable tolerance range for friction block 56.

In other words, midsection 88 uses a soft elastic material to redistribute local and frictional forces evenly across concave surface 86 and lever plate 90 to enhance the frictional locking force of lever 44 in the locked position 46. Midsection 88 also provides a spring and damper absorption system of generated and local frictional forces on friction block 56 to secure the normal-force generated by cam lever 44 against extendable handle 12.

Lever plate 90 is a hard material, such as a metal that receives the normal-force from the cam surface of base 60 on lever 44. The hard top layer or lever plate 90 has a toughness that avoids wear. When lever 44 is rotated about pivot 54, the base 60 cam surface presses against lever plate 90 to sandwich midsection 88 and generates a normal-force on concave surface 86 against extendable handle 12. Lever plate 90 distributes this force across a top side of midsection 88 and enables midsection 88 to redistribute the normal-force across concave surface 86 to enhance the frictional force that locks extendable handle 12 when lever 44 is in the locked position 46.

Figure 15:
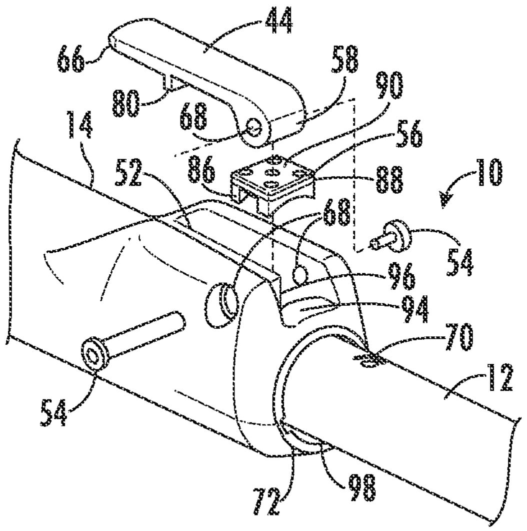
FIG. 15 is an exploded view of a pipe wrench with an extendable handle, according to an exemplary embodiment.
Figure 16A:
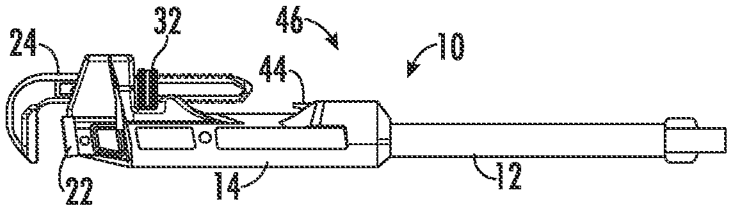
FIGS. 16A-D show the rotation process of removing the handle through the channel-lock, according to an exemplary embodiment.
Figure 16B:
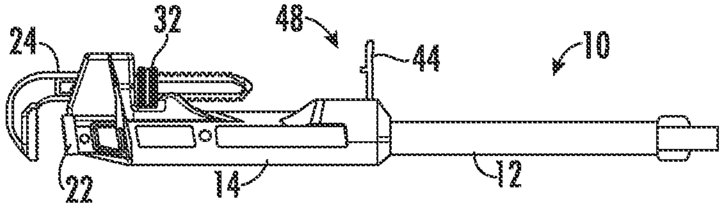
Figure 16C:
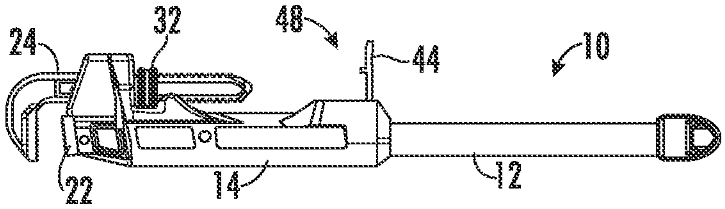
Figure 16D:
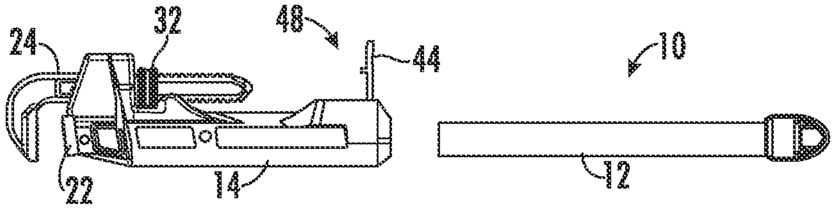

With reference to FIGS. 14 and 15, friction block 56 is captured by lever 44 directly against handle 12 through an enclosed cavity 96 in recess 52 of head 14. In general, lever 44 (either base 60 or wall 58) and the enclosed cavity 96 in head 14 completely capture friction block 56 against handle 12 when handle 12 is inserted within bore 16. Additional tabs 94 on head 14 and inserts 92 on friction block 56 retain friction block within head 14 when handle 12 is removed from bore 16 and prevent friction block 56 from entering bore 16 or escaping from head 14.

FIG. 15 is an exploded view of pipe wrench 10 with extendable handle 12 partially removed. Cam surface of base 60 on lever 44 is shown in the locked position 46, such that when pivot 54 is passed through pivot 54 of lever 44, the thickness of base 60 is greater than the thickness of wall 58 and lever 44 presses against friction block 56 to lock extendable handle 12. The three separate components or layers of friction block 56 include the concave surface 86, the midsection 88, and the lever plate 90. As described above, these three component layers of friction block 56 redistribute normal-forces to maximize the frictional forces on handle 12 generated by lever 44. An indicator 70, shown a as laser etching, visually identifies to the user the maximum extension limit of handle 12 relative to the edge 72 of bore 16. Indicator 70 also indicates the rotation directions for the user to release handle 12 from bore 16 and insert extendable handle 12 into the channel-lock 74.

FIG. 16 shows the rotation process of removing the extendable handle 12 through channel-lock 74. The process begins at step A. In step A, lever 44 is in the locked position

46, and handle 12 is fully extended. In step B, the user rotates lever 44 about pivot 54 to release handle 12 from bore 16. The user then rotates extendable handle 12 between 45 and 90 degrees, shown in step C, to disengage channel-lock 74 (FIG. 13). In step D, handle 12 is pulled from within bore 16 and fully released and removed from within head 14.

The removal of extendable handle 12 from bore 16 vacates bore 16 and makes head 14 available to receive another pipe, or a differently sized extension handle 12, within bore 16. For example, handle 12 has an outer diameter equal to standard pipe outer diameters (e.g., ½ in, ¾ in, 1 in, 1.24 in 1.5 in, or 2 in pipes). When handle 12 is removed/released from bore 16, the user inserts a standard pipe with the desired length into bore 16 to obtain a desired total length 36. In this way, an operator can select discreet lengths of standard pipe and/or select from a variety of extendable handles 12 to obtain the desired extended handle length 38. Bore 16 in head 14 enables the inserted pipe or new handle 12 to have a different range defined between the maximum and minimum locations of bore 16 within head 14. In other words, in some embodiments, bore 16 is sized to receive an outer pipe diameter, and extendable handle 12 is removed entirely from bore 16 and replaced with either a standard-sized pipe or a handle 12 with a different length. In either configuration, lever 44 operates between a maximum and minimum or range to provide an optimal range for the pipe wrench 10.

Similarly, lever 44 operates substantially the same as described above. Specifically, lever rotates into a locked position 46 to force friction block 56 against the inserted pipe (or new extension handle 12). The friction locks the inserted pipe that extends from bore 16 of head 14 at any point between the maximum and minimum extensions within bore 16. In other words, from the user's perspective, the inserted pipe functions similarly to the locked position 46 of extendable handle 12.

Figure 17:
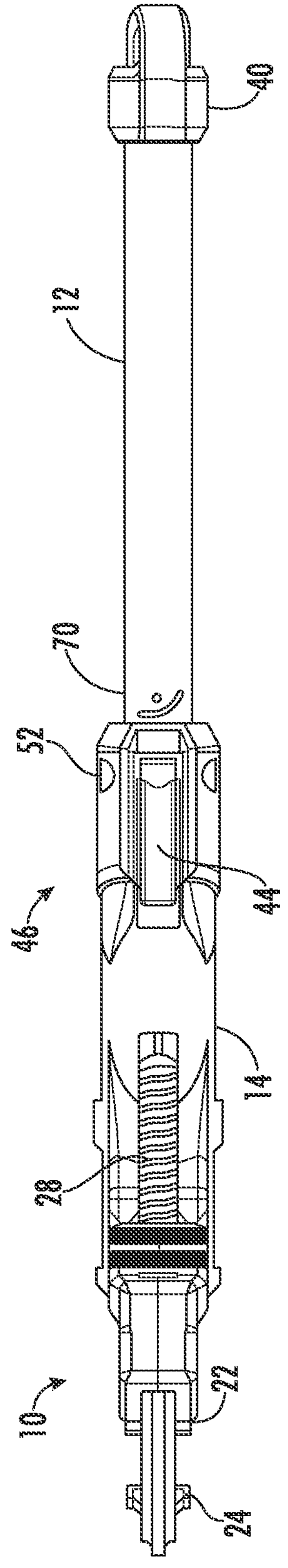
FIG. 17 is a view of the handle with a visual indicator illustrating the rotation of handle to lock or remove the handle, according to an exemplary embodiment.
Figure 18:
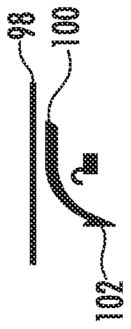
FIG. 18 is a detailed view of the laser etch shown in FIG. 17, according to an exemplary embodiment.

FIG. 17 is a view of the extendable handle 12 with an indicator 70, such as an applied sticker or laser etching. Indicator 70 illustrates the rotational directions of extendable handle 12 for the user to lock and/or remove the handle 12 from bore 16. FIG. 18 is a detailed view of indicator 70 shown in FIG. 17. Indicator 70 includes a maximum extension line 98 that aligns with edge 72 of bore 16. For example, when handle 12 is fully extended, or properly and completely inserted into head 14, maximum extension line 98 on handle 12 aligns with edge 72 of bore 16. Indicator 70 also has an upper line 100 that indicates the rotational insertion direction and a lower arrow 102 that indicates the rotational removal direction.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.)

without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes, and omissions may also be made in the design, operating conditions, and arrangement of the various exemplary embodiments without departing from the scope of the present invention.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

In various exemplary embodiments, the relative dimensions, including angles, lengths, and radii, as shown in the Figures, are to scale. Actual measurements of the Figures will disclose relative dimensions, angles, and proportions of the various exemplary embodiments. Various exemplary embodiments extend to various ranges around the absolute and relative dimensions, angles, and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description. In addition, in various embodiments, the present disclosure extends to a variety of ranges (e.g., plus or minus 30%, 20%, or 10%) around any of the absolute or relative dimensions disclosed herein or determinable from the Figures.

What is claimed is:

1. A wrench, comprising:

a head comprising:

an aperture;

a bore at a first end of the head and extending along a longitudinal axis of the wrench;

a lower jaw coupled to a second end of the head, the lower jaw defining a lower contact region;

an upper jaw partially extending through the aperture of the head, the upper jaw defining an upper contact region;

an actuator engaged with the upper jaw such that rotation of the actuator moves the upper jaw relative to the lower jaw;

an extendable handle received within the bore of the head;

a lever comprising an end, the end comprising at least two cam surfaces; and a friction block positioned between the lever and the extendable handle;

wherein the lever is rotatable about a pivot between a locked position in which the extendable handle is fixed with respect to the head and an unlocked position in which the extendable handle is adjustable with respect to the head;

wherein the end of the lever engages the friction block in both the locked position and in the unlocked position;

wherein the head further comprises a rear surface, and wherein the rear surface includes a recess configured to receive the lever when the lever is in the locked position.

2. The wrench of claim 1, wherein the lever applies a normal force on the friction block when in the locked position and the friction block distributes the normal force to the extendable handle such that the extendable handle is secured at a desired length.

3. The wrench of claim 1, wherein the at least two cam surfaces comprise a first cam surface and a second cam surface and wherein the first cam surface of the lever applies a first force on the friction block in the locked position and the second cam surface applies a second force on the friction block in the unlocked position.

4. The wrench of claim 1, wherein the friction block includes a concave surface layer formed from a first material, a midsection layer formed from a second material, and a plate layer having a flat rectangular shape and formed from a third material.

5. The wrench of claim 4, wherein the first material has a first hardness, the second material has a second hardness, and the third material has a third hardness, and wherein the second hardness is less than first hardness and the third hardness.

6. The wrench of claim 4, wherein the second material is a compressible elastic material such that a normal force on the concave surface layer is distributed between the concave surface layer, the midsection layer and the plate layer.

7. The wrench of claim 1, further comprising a channel lock mechanism including:

a channel extending longitudinally within the head;

a biased projection coupled to the extendable handle, the biased projection configured to slide within the channel during adjustment of the extendable handle;

a pocket at the first end of the head configured to capture the biased projection such that the extendable handle is retained within the bore; and an angled groove within the head;

wherein, when the lever is in the unlocked position and the extendable handle is extended to a maximum length the angled groove interfaces with the biased projection such that the biased projection is pushed inward and the extendable handle is released from the bore.

8. The wrench of claim 1, the lever further comprising a gripping end and an arm coupled to an inner surface of the lever, the gripping end opposing the pivot and the arm extending across the inner surface in a perpendicular orientation relative to a longitudinal axis of the lever.

9. A pipe wrench, comprising:

a head comprising an aperture and a recess;

a bore at a first end of the head and extending along a longitudinal axis of the pipe wrench;

a lower jaw coupled to a second end of the head, the lower jaw comprising a plurality of teeth that define a lower contact region;

an upper jaw partially extending through the aperture of the head, the upper jaw comprising a plurality of teeth that define an upper contact region;

an actuator engaged with the upper jaw such that rotation of the actuator moves the upper jaw relative to the lower jaw;

an extendable handle received within the bore of the head; and a handle length locking mechanism comprising:

a lever pivotally coupled to the head, the lever comprising a base and a wall at an end; and a friction element positioned between the lever and the extendable handle, the friction element contacting the lever;

wherein the lever is rotatable about a pivot between a locked position in which the lever is positioned in the recess and the base faces the extendable handle and an unlocked position in which the base faces the upper jaw and the extendable handle is adjustable with respect to the head.

10. The pipe wrench of claim 9, wherein, when the lever is in the locked position, the lever pushes the friction element into engagement with the extendable handle such that the extendable handle is fixed with respect to the head and wherein, when the lever is in the unlocked position the extendable handle is adjustable with respect to the head.

11. The pipe wrench of claim 9, further comprising a channel lock mechanism configured to retain the extendable handle within the bore, the channel lock mechanism comprising:

a channel extending longitudinally within the head;

a biased projection coupled to the extendable handle, the biased projection configured to slide within the channel during adjustment of the extendable handle;

a pocket at the first end of the head configured to capture the biased projection such that the extendable handle is retained within the bore; and an angled groove within the head.

12. The pipe wrench of claim 11, wherein, when the lever is in the unlocked position and the extendable handle is extended to a maximum length the angled groove interfaces with the biased projection such that the biased projection is pushed inward and the extendable handle is released from the bore.

13. The pipe wrench of claim 9, wherein the base applies a first force on the friction element in the locked position and the wall applies a second force on the friction element in the unlocked position, and wherein the first force is different from the second force.

14. The pipe wrench of claim 9, wherein a base thickness is defined between an edge of the pivot and a surface of the base and wherein a wall thickness is defined between an edge of the pivot and a surface of the wall, and wherein the base thickness is greater than the wall thickness.

15. The pipe wrench of claim 9, the friction element comprising:

a bottom layer having a concave surface and formed from a first material;

a midsection layer formed from a second material; and a plate layer formed from a third material.

16. A pipe wrench, comprising:

a head comprising an aperture and a recess;

shoulders positioned on opposing sides of the recess;

a bore at a first end of the head and extending along a longitudinal axis of the pipe wrench;

a lower jaw coupled to a second end of the head;

an upper jaw partially extending through the aperture of the head;

an actuator engaged with the upper jaw such that rotation of the actuator moves the upper jaw relative to the lower jaw;

an extendable handle received within the bore of the head;

a lever; and a friction block positioned between the lever and the extendable handle;

wherein the lever is rotatable about a pivot between a locked position in which the lever extends within the recess, between the shoulders and along the longitudinal axis of the pipe wrench and an unlocked position in which the lever extends in a perpendicular orientation to the longitudinal axis of the pipe wrench.

17. The pipe wrench of claim 16, wherein the lever applies a normal force on the friction block and the friction block distributes the normal force to the extendable handle such that the extendable handle is secured at a desired length.

18. The pipe wrench of claim 16, wherein the friction block includes a bottom layer having a concave surface and formed from a first material, a midsection layer formed from a second material, and a plate layer formed from a third material and wherein the concave surface of the bottom layer distributes a normal force across the extendable handle such that a friction force is generated by the friction block.

19. The pipe wrench of claim 16, wherein the lever is a cam lever comprising:

an end of the lever adjacent to the pivot, the end comprising:

a base having a base thickness defined between an edge of the pivot and an outer surface of the base; and a wall having a wall thickness defined between an edge of the pivot and an outer wall surface.

* * * * *